United States Patent
Weiss

(10) Patent No.: US 9,489,531 B2
(45) Date of Patent: Nov. 8, 2016

(54) SYSTEM AND METHOD FOR CONTROLLING ACCESS TO ELECTRONIC DEVICES

(75) Inventor: Andrew Weiss, San Ramon, CA (US)

(73) Assignee: Location Labs, Inc., Emeryville, CA (US)

(*) Notice: Subject to any disclaimer, the term of this patent is extended or adjusted under 35 U.S.C. 154(b) by 0 days.

(21) Appl. No.: 13/470,321

(22) Filed: May 13, 2012

(65) Prior Publication Data

US 2013/0305384 A1  Nov. 14, 2013

(51) Int. Cl.
G06F 17/30 (2006.01)
G06F 21/62 (2013.01)
H04M 1/725 (2006.01)

(52) U.S. Cl.
CPC ...... *G06F 21/6218* (2013.01); *H04M 1/72577* (2013.01); *G06F 2221/2137* (2013.01); *G06F 2221/2149* (2013.01)

(58) Field of Classification Search
CPC ...... G06Q 10/10; G06Q 50/01; G06Q 30/02; H04W 4/02; H04W 1/72577; G06F 21/10; G06F 21/6218; G06F 2221/2137; G06F 2221/2149
See application file for complete search history.

(56) References Cited

U.S. PATENT DOCUMENTS

| | | | |
|---|---|---|---|
| 3,778,809 A | 12/1973 | Hawes | |
| 4,956,825 A * | 9/1990 | Wilts et al. | 368/9 |
| 5,434,562 A * | 7/1995 | Reardon | 726/34 |
| 5,673,691 A * | 10/1997 | Abrams | G06F 15/025 128/921 |
| 5,882,258 A * | 3/1999 | Kelly et al. | 463/11 |
| 5,907,831 A * | 5/1999 | Lotvin | G06Q 30/02 434/322 |
| 5,973,683 A * | 10/1999 | Cragun et al. | 709/217 |
| 6,011,973 A | 1/2000 | Valentine et al. | |
| 6,023,692 A * | 2/2000 | Nichols | 706/14 |
| 6,161,008 A * | 12/2000 | Lee et al. | 455/415 |
| 6,437,696 B1 | 8/2002 | Lemelson et al. | |
| 6,529,724 B1 | 3/2003 | Khazaka et al. | |
| 6,587,835 B1 | 7/2003 | Treyz et al. | |
| 6,690,940 B1 | 2/2004 | Brown et al. | |
| 6,701,234 B1 | 3/2004 | Vogelsang | |
| 6,731,746 B1 | 5/2004 | Usami | |

(Continued)

FOREIGN PATENT DOCUMENTS

| | | | | |
|---|---|---|---|---|
| FR | 2863439 A1 * | 6/2005 | | |
| GB | EP 1770969 A1 * | 4/2007 | ........... | H04M 1/656 |
| WO | WO 2011137279 A2 * | 11/2011 | | |

OTHER PUBLICATIONS

Kohavi, "Emerging Trends in Business Analytics", Communications of the ACM, Aug. 2002, vol. 45, No. 8, pp. 45-48.*

(Continued)

*Primary Examiner* — Andrew Nalven
*Assistant Examiner* — Walter Malinowski
(74) *Attorney, Agent, or Firm* — Dovas Law, P.C.

(57) ABSTRACT

A computer implemented method for controlling access to an electronic media source is disclosed. An access control system receives achievement goals and degree of access information. Assessment information is also received by the access control system from one or more input data sources. The access control system determines whether the achievement goals are met based on the received assessment information and forwards an access signal to the electronic media source based on the access determination. The access signal, including a grant signal, is forwarded when the achievement goals are met.

23 Claims, 3 Drawing Sheets

(56) References Cited

U.S. PATENT DOCUMENTS

| | | | |
|---|---|---|---|
| 6,782,266 B2 | 8/2004 | Baer et al. | |
| 6,834,195 B2 | 12/2004 | Brandenberg et al. | |
| 6,873,850 B2 | 3/2005 | Dowling et al. | |
| 6,895,238 B2 | 5/2005 | Newell et al. | |
| 6,961,562 B2 | 11/2005 | Ross | |
| 6,985,696 B2 | 1/2006 | Bromham et al. | |
| 7,178,720 B1* | 2/2007 | Strubbe | G06Q 10/00 235/375 |
| 7,181,229 B2 | 2/2007 | Singh et al. | |
| 7,257,367 B2* | 8/2007 | Etuk et al. | 434/350 |
| 7,272,633 B2 | 9/2007 | Malik et al. | |
| 7,705,726 B2 | 4/2010 | Graves et al. | |
| 7,729,945 B1* | 6/2010 | Katz et al. | 705/26.1 |
| 7,839,891 B1 | 11/2010 | Allan | |
| 7,869,792 B1 | 1/2011 | Zhou et al. | |
| 7,876,704 B1 | 1/2011 | Bims et al. | |
| 7,899,438 B2 | 3/2011 | Baker et al. | |
| 7,925,690 B2 | 4/2011 | Smith et al. | |
| 8,010,037 B2* | 8/2011 | Bannwolf | G09B 7/02 434/350 |
| 8,024,290 B2 | 9/2011 | Yang et al. | |
| 8,095,175 B2 | 1/2012 | Todd et al. | |
| 8,095,413 B1* | 1/2012 | Beaven | G06Q 10/0637 705/7.29 |
| 8,107,432 B2 | 1/2012 | Seo | |
| 8,121,879 B1* | 2/2012 | Cohen | G06Q 10/06 705/7.14 |
| 8,135,392 B2 | 3/2012 | Marcellino et al. | |
| 8,145,240 B2 | 3/2012 | Roumeliotis et al. | |
| 8,160,560 B2 | 4/2012 | Geyer et al. | |
| 8,175,642 B2 | 5/2012 | Shah | |
| 8,193,982 B2 | 6/2012 | Kupfer et al. | |
| 8,225,413 B1 | 7/2012 | De et al. | |
| 8,249,627 B2 | 8/2012 | Olincy et al. | |
| 8,270,933 B2 | 9/2012 | Riemer et al. | |
| 8,280,438 B2 | 10/2012 | Barbera | |
| 8,315,905 B1 | 11/2012 | Adair | |
| 8,351,408 B2 | 1/2013 | Daigle | |
| 8,384,555 B2 | 2/2013 | Rosen | |
| 8,401,521 B2 | 3/2013 | Bennett | |
| 8,412,154 B1 | 4/2013 | Leemet et al. | |
| 8,417,268 B1 | 4/2013 | Halferty et al. | |
| 8,428,623 B2 | 4/2013 | Roumeliotis et al. | |
| 8,527,013 B2 | 9/2013 | Guba et al. | |
| 8,594,065 B2 | 11/2013 | Polito et al. | |
| 8,620,354 B2 | 12/2013 | Beasley | |
| 8,621,075 B2 | 12/2013 | Luna | |
| 8,635,708 B2 | 1/2014 | Mahan | |
| 8,731,530 B1 | 5/2014 | Breed et al. | |
| 8,738,688 B2 | 5/2014 | Myers et al. | |
| 8,761,821 B2 | 6/2014 | Tibbitts et al. | |
| 8,849,095 B2* | 9/2014 | Hoofien | H04N 17/004 386/248 |
| 8,971,927 B2 | 3/2015 | Zhou et al. | |
| 9,019,068 B2 | 4/2015 | Varoglu | |
| 9,042,872 B1 | 5/2015 | Breed et al. | |
| 9,124,703 B2 | 9/2015 | Tadayon et al. | |
| 2002/0012894 A1* | 1/2002 | Becker | 432/201 |
| 2002/0116266 A1 | 8/2002 | Marshall | |
| 2002/0174180 A1 | 11/2002 | Brown et al. | |
| 2002/0178046 A1* | 11/2002 | Lawrence | G06Q 30/02 705/35 |
| 2003/0005306 A1 | 1/2003 | Hunt et al. | |
| 2003/0064788 A1 | 4/2003 | Walker et al. | |
| 2003/0082508 A1* | 5/2003 | Barney | G09B 5/00 434/308 |
| 2003/0211889 A1* | 11/2003 | Walker et al. | 463/42 |
| 2003/0216138 A1 | 11/2003 | Higuchi et al. | |
| 2003/0216960 A1 | 11/2003 | Postrel | |
| 2004/0024569 A1* | 2/2004 | Camillo | G09B 7/02 702/182 |
| 2004/0030599 A1* | 2/2004 | Sie | G06Q 30/02 705/14.4 |
| 2004/0039624 A1* | 2/2004 | Ikezawa | G06Q 10/06311 705/7.13 |
| 2004/0083472 A1 | 4/2004 | Rao et al. | |
| 2004/0166878 A1 | 8/2004 | Erskine et al. | |
| 2004/0186776 A1 | 9/2004 | Llach | |
| 2004/0214584 A1 | 10/2004 | Marinier | |
| 2004/0219493 A1* | 11/2004 | Phillips | G09B 5/06 434/118 |
| 2004/0267607 A1* | 12/2004 | Maddux | G06F 17/27 705/7.42 |
| 2005/0003895 A1* | 1/2005 | Nara | 463/42 |
| 2005/0039206 A1 | 2/2005 | Opdycke | |
| 2005/0096009 A1 | 5/2005 | Ackley | |
| 2005/0282559 A1 | 12/2005 | Erskine et al. | |
| 2005/0287502 A1* | 12/2005 | Southard | G09B 19/0092 434/236 |
| 2006/0009234 A1 | 1/2006 | Freer | |
| 2006/0085419 A1 | 4/2006 | Rosen | |
| 2006/0085547 A1 | 4/2006 | Cormier | |
| 2006/0089878 A1 | 4/2006 | Roberts et al. | |
| 2006/0184792 A1 | 8/2006 | Berlin | |
| 2006/0270476 A1* | 11/2006 | Denkewicz, Jr. | 463/9 |
| 2006/0276180 A1 | 12/2006 | Henry | |
| 2007/0039624 A1* | 2/2007 | Roberts et al. | 705/3 |
| 2007/0041545 A1 | 2/2007 | Gainsboro | |
| 2007/0088610 A1 | 4/2007 | Chen | |
| 2007/0100595 A1 | 5/2007 | Earles et al. | |
| 2007/0142068 A1 | 6/2007 | Matsuo | |
| 2007/0203872 A1* | 8/2007 | Flinn et al. | 706/62 |
| 2007/0208802 A1 | 9/2007 | Barman et al. | |
| 2007/0263843 A1 | 11/2007 | Foxenland | |
| 2007/0282678 A1 | 12/2007 | Dendi et al. | |
| 2008/0070588 A1 | 3/2008 | Morin | |
| 2008/0119207 A1 | 5/2008 | Harris | |
| 2008/0146211 A1 | 6/2008 | Mikan et al. | |
| 2008/0146250 A1 | 6/2008 | Aaron | |
| 2008/0153511 A1 | 6/2008 | Mock | |
| 2008/0176585 A1 | 7/2008 | Eldering | |
| 2008/0183560 A1 | 7/2008 | Kaplan et al. | |
| 2008/0199199 A1* | 8/2008 | Kato et al. | 399/81 |
| 2008/0201441 A1 | 8/2008 | Bodic et al. | |
| 2008/0201469 A1* | 8/2008 | Reasor et al. | 709/224 |
| 2008/0246605 A1 | 10/2008 | Pfeffer et al. | |
| 2008/0294589 A1 | 11/2008 | Chu et al. | |
| 2008/0299954 A1 | 12/2008 | Wright et al. | |
| 2009/0002147 A1 | 1/2009 | Bloebaum et al. | |
| 2009/0017750 A1* | 1/2009 | Marcinkiewicz | 455/3.05 |
| 2009/0038005 A1* | 2/2009 | Howarth | H04L 63/102 726/21 |
| 2009/0055938 A1* | 2/2009 | Samuel | 726/30 |
| 2009/0064316 A1* | 3/2009 | Liao et al. | 726/18 |
| 2009/0089876 A1* | 4/2009 | Finamore et al. | 726/21 |
| 2009/0181356 A1* | 7/2009 | Dasgupta | 434/362 |
| 2009/0203352 A1 | 8/2009 | Fordon et al. | |
| 2009/0204471 A1* | 8/2009 | Elenbaas et al. | 726/28 |
| 2009/0247124 A1 | 10/2009 | De Atley et al. | |
| 2009/0248436 A1 | 10/2009 | Takagi et al. | |
| 2009/0251282 A1 | 10/2009 | Fitzgerald et al. | |
| 2009/0271247 A1 | 10/2009 | Karelin et al. | |
| 2009/0286218 A1* | 11/2009 | Johnson et al. | 434/353 |
| 2009/0298019 A1* | 12/2009 | Rogan et al. | 434/107 |
| 2009/0325566 A1 | 12/2009 | Bell et al. | |
| 2010/0028844 A1* | 2/2010 | Wiseman | 434/322 |
| 2010/0037088 A1 | 2/2010 | Krivopaltsev et al. | |
| 2010/0042493 A1 | 2/2010 | Nino et al. | |
| 2010/0058446 A1* | 3/2010 | Thwaites | 726/4 |
| 2010/0100398 A1 | 4/2010 | Auker et al. | |
| 2010/0100618 A1* | 4/2010 | Kuhlke et al. | 709/224 |
| 2010/0106573 A1 | 4/2010 | Gallagher et al. | |
| 2010/0113013 A1 | 5/2010 | Karabinis et al. | |
| 2010/0116884 A1* | 5/2010 | Alderucci | G06F 21/10 235/382 |
| 2010/0125028 A1* | 5/2010 | Heppert | A63B 24/0059 482/8 |
| 2010/0145976 A1* | 6/2010 | Higgins et al. | 707/765 |
| 2010/0154024 A1 | 6/2010 | Boxmeyer | |
| 2010/0210254 A1 | 8/2010 | Kelly et al. | |
| 2010/0211887 A1* | 8/2010 | Woollcombe | 715/751 |
| 2010/0235223 A1 | 9/2010 | Lyman | 705/10 |
| 2010/0240399 A1 | 9/2010 | Roumeliotis et al. | |
| 2010/0241496 A1 | 9/2010 | Gupta et al. | |

(56) References Cited

U.S. PATENT DOCUMENTS

| | | | |
|---|---|---|---|
| 2010/0250352 A1* | 9/2010 | Moore | 705/14.16 |
| 2010/0268768 A1* | 10/2010 | Kurtenbach et al. | 709/203 |
| 2010/0285871 A1* | 11/2010 | Shah | G06F 21/552 463/29 |
| 2010/0317420 A1* | 12/2010 | Hoffberg | 463/1 |
| 2010/0330543 A1 | 12/2010 | Black et al. | |
| 2010/0330972 A1 | 12/2010 | Angiolillo | |
| 2011/0029598 A1 | 2/2011 | Arnold et al. | |
| 2011/0040586 A1 | 2/2011 | Murray et al. | |
| 2011/0045868 A1 | 2/2011 | Sheha et al. | |
| 2011/0047078 A1* | 2/2011 | Ginter et al. | 726/30 |
| 2011/0055546 A1 | 3/2011 | Klassen et al. | |
| 2011/0070567 A1* | 3/2011 | Linton | G09B 7/02 434/219 |
| 2011/0092159 A1 | 4/2011 | Park et al. | |
| 2011/0093161 A1 | 4/2011 | Zhou et al. | |
| 2011/0117878 A1 | 5/2011 | Barash et al. | |
| 2011/0124399 A1 | 5/2011 | Dutilly et al. | |
| 2011/0151830 A1 | 6/2011 | Blanda et al. | |
| 2011/0231280 A1 | 9/2011 | Farah | |
| 2011/0236872 A1* | 9/2011 | Taylor | 434/350 |
| 2011/0244825 A1 | 10/2011 | Ewell | |
| 2011/0244837 A1 | 10/2011 | Murata et al. | |
| 2011/0252375 A1 | 10/2011 | Chaudhri | |
| 2011/0275321 A1 | 11/2011 | Zhou et al. | |
| 2011/0294520 A1 | 12/2011 | Zhou et al. | |
| 2011/0296014 A1 | 12/2011 | Cancel et al. | |
| 2011/0302003 A1* | 12/2011 | Shirish et al. | 705/7.38 |
| 2011/0302024 A1 | 12/2011 | Gunawardana et al. | |
| 2011/0307434 A1 | 12/2011 | Rostampour et al. | |
| 2011/0320259 A1 | 12/2011 | Roumeliotis et al. | |
| 2012/0001548 A1 | 1/2012 | Recker et al. | |
| 2012/0036220 A1 | 2/2012 | Dare et al. | |
| 2012/0040761 A1 | 2/2012 | Auterio et al. | |
| 2012/0058744 A1 | 3/2012 | Felt et al. | |
| 2012/0066088 A1* | 3/2012 | Murset | G06Q 10/06 705/26.8 |
| 2012/0069131 A1* | 3/2012 | Abelow | 348/14.01 |
| 2012/0081500 A1 | 4/2012 | Border et al. | |
| 2012/0083287 A1 | 4/2012 | Casto et al. | |
| 2012/0084349 A1 | 4/2012 | Lee et al. | |
| 2012/0110071 A1 | 5/2012 | Zhou et al. | |
| 2012/0131161 A1* | 5/2012 | Ferris et al. | 709/223 |
| 2012/0142379 A1 | 6/2012 | Park | |
| 2012/0151384 A1 | 6/2012 | Stass | |
| 2012/0166285 A1* | 6/2012 | Shapiro et al. | 705/14.58 |
| 2012/0171990 A1 | 7/2012 | Williams et al. | |
| 2012/0172100 A1* | 7/2012 | Colar | A63F 13/12 463/9 |
| 2012/0179767 A1 | 7/2012 | Clarke et al. | |
| 2012/0188163 A1 | 7/2012 | Xiao | |
| 2012/0192016 A1 | 7/2012 | Gotesdyner et al. | |
| 2012/0195295 A1 | 8/2012 | Elmaleh | |
| 2012/0214472 A1 | 8/2012 | Tadayon et al. | |
| 2012/0215328 A1* | 8/2012 | Schmelzer | G06F 19/3481 700/91 |
| 2012/0215617 A1 | 8/2012 | Shah et al. | |
| 2012/0223861 A1 | 9/2012 | Kupfer et al. | |
| 2012/0226704 A1 | 9/2012 | Boland et al. | |
| 2012/0244883 A1 | 9/2012 | Tibbits et al. | |
| 2012/0253918 A1* | 10/2012 | Marois et al. | 705/14.39 |
| 2012/0254949 A1* | 10/2012 | Mikkonen et al. | 726/4 |
| 2012/0258740 A1 | 10/2012 | Mildh et al. | |
| 2012/0260118 A1 | 10/2012 | Jiang et al. | |
| 2012/0271908 A1 | 10/2012 | Luna et al. | |
| 2012/0280916 A1* | 11/2012 | Xia et al. | 345/173 |
| 2012/0315880 A1 | 12/2012 | Peitrow et al. | |
| 2012/0323990 A1 | 12/2012 | Hayworth | |
| 2012/0330702 A1 | 12/2012 | Kowalski et al. | |
| 2013/0040629 A1 | 2/2013 | Sprigg et al. | |
| 2013/0047229 A1 | 2/2013 | Hoefel | |
| 2013/0054674 A1 | 2/2013 | Myers et al. | |
| 2013/0082878 A1 | 4/2013 | Jarvis et al. | |
| 2013/0084847 A1 | 4/2013 | Tibbitts et al. | |
| 2013/0091453 A1* | 4/2013 | Kotler et al. | 715/772 |
| 2013/0104246 A1* | 4/2013 | Bear et al. | 726/28 |
| 2013/0111462 A1 | 5/2013 | Umansky et al. | |
| 2013/0111510 A1* | 5/2013 | Baker et al. | 725/13 |
| 2013/0143512 A1 | 6/2013 | Hernandez et al. | |
| 2013/0143521 A1 | 6/2013 | Hernandez et al. | |
| 2013/0143528 A1 | 6/2013 | Randazzo et al. | |
| 2013/0145007 A1 | 6/2013 | Randazzo et al. | |
| 2013/0185411 A1 | 7/2013 | Martin | |
| 2013/0198272 A1 | 8/2013 | Shionoya et al. | |
| 2013/0198296 A1 | 8/2013 | Roy et al. | |
| 2013/0217331 A1 | 8/2013 | Manente | |
| 2013/0217363 A1 | 8/2013 | Myers | |
| 2013/0303106 A1 | 11/2013 | Martin | |
| 2013/0316746 A1 | 11/2013 | Miller et al. | |
| 2013/0332886 A1 | 12/2013 | Cranfill et al. | |
| 2013/0339345 A1 | 12/2013 | Soto et al. | |
| 2013/0346333 A1 | 12/2013 | Hassler et al. | |
| 2014/0108649 A1 | 4/2014 | Barton et al. | |
| 2014/0148192 A1 | 5/2014 | Hodges et al. | |
| 2014/0180438 A1 | 6/2014 | Hodges et al. | |
| 2014/0310327 A1 | 10/2014 | Yip et al. | |
| 2014/0310365 A1 | 10/2014 | Sample et al. | |
| 2014/0310403 A1 | 10/2014 | Weiss et al. | |
| 2014/0338006 A1 | 11/2014 | Grkov et al. | |
| 2015/0040246 A1 | 2/2015 | Yuen et al. | |
| 2015/0163664 A1 | 6/2015 | Martin | |
| 2015/0188777 A1 | 7/2015 | Frost | |

OTHER PUBLICATIONS

Office Action Dated Mar. 20, 2014 for U.S. Appl. No. 13/470,323.
Advisory Action dated Feb. 24, 2014 for U.S. Appl. No. 13/351,092.
U.S. Appl. No. 14/089,8388.
U.S. Appl. No. 13/688,142.
U.S. Appl. No. 13/723,119.
Office Action dated Jan. 16, 2013 for U.S. Appl. No. 13/087,302.
Office Action dated Mar. 18, 2013 for U.S. Appl. No. 13/351,092.
Office Action dated Nov. 6, 2013 for U.S. Appl. No. 13/351,092.

\* cited by examiner

SYSTEM AND METHOD FOR CONTROLLING ACCESS TO ELECTRONIC DEVICES

FIELD OF INVENTION

The present invention relates to electronic devices. More specifically, the present, invention relates to a system for supporting electronic devices.

BACKGROUND

Gaming, movies, television shows, and friend information have become easier for children to access as more and more electronic media and electronic devices, both mobile and stationary, have allowed access to this content. Today's children spend a large amount of time engaged with television, personal computers, gaming consoles, portable gaming platforms, E-readers, the Internet, content providers such as Netflix™, cell phone voice and messaging communications, and mobile gaming.

Unfortunately for parents of these children, controlling access to electronic media has become very difficult. This is especially true for those parents that implement incentive based access to electronic media, e.g., allowing a child to play a gaming system, such as Wii® and Playstation® only when the child is doing well in school or has completed all of his/her chores.

Currently, the only ways parents are able to control access to electronic media and/or devices is by controlling their child's physical access to the electronic media or using a restricting password when the device allows it. These methods require the parent to monitor the child and the electronic device. Depending on the parent's availability, these methods require a lot of attention and time, resulting sometimes in non-implementation.

Therefore, there exists a need for an improved system and method for controlling access to electronic media and electronic devices.

SUMMARY

A computer implemented method for controlling access to electronic media is disclosed. An access control system receives achievement goals and degree of access information. Assessment information is also received by the access control system from one or more input data sources. An access inquiry is received from the electronic media inquiring whether the electronic media is able to be accessed. The access control system then determines whether the achievement goals are met based on the received assessment information and forwards an access signal to the electronic media based on the access determination. The access signal, including a grant signal, is forwarded when the achievement goals are met. For those media for which there is no ability to control access, the access control system monitors overall usage, determines when all allotted media access has been used, and forwards an alert to a particular party indicating the allotted media access has been used.

BRIEF DESCRIPTION OF THE DRAWING(S)

A more detailed understanding of the disclosed system and method may be had from the following description, given by way of example and to be understood in conjunction with the accompanying drawings.

DETAILED DESCRIPTION

Although the features and elements are described in particular combinations, each feature or element can be used alone (without the other feature or elements) or in various combinations with or without other features and elements.

A system and computer-implemented method are disclosed for controlling access to electronic devices and/or electronic media, for example, mobile phones, gaming systems, computers, social media, and Netflix™ online movie service or other content provider. In accordance with this disclosure, one or more electronic devices and/or media will be identified as an electronic media source(s).

Figure 1:
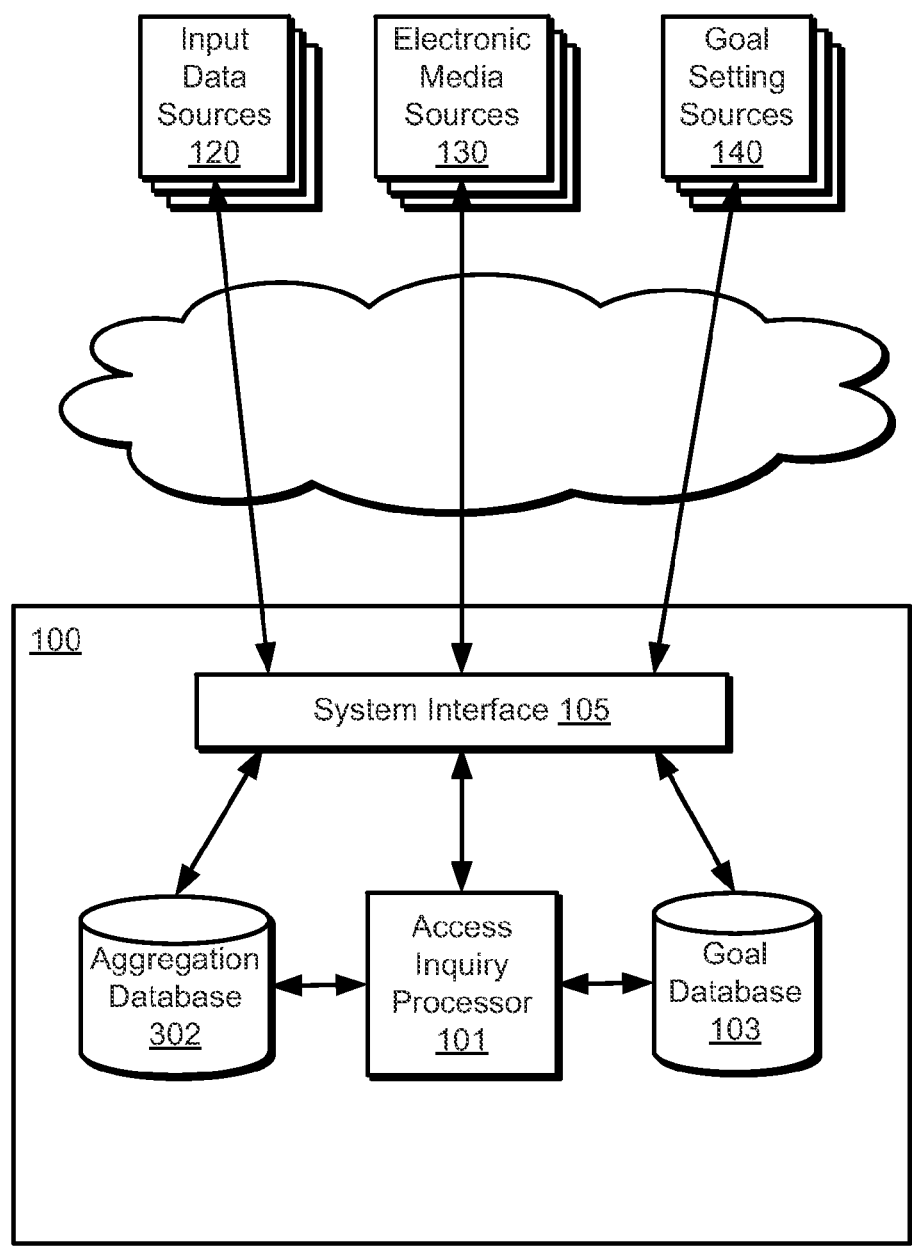
FIG. 1 is a block diagram of an example system for controlling access to electronic media sources.

FIG. 1 illustrates an example block diagram of a disclosed access control system 100. The access control system 100 comprises an access inquiry processor 101, an aggregation database 102, and a goal database 103. The access control system 100 is coupled to one or more input data sources 120 and one or more electronic media sources 130 via a system interface 105. In accordance with the disclosed system, the access control system 100 receives via the system interface 105 one or more achievement goals, to be disclosed below, from one or more goal setting source(s) 140, and stores the achievement goals in the goal database 103. A goal setting source 140 may include for example a parent, a teacher, a student adviser, and/or a guidance counselor enabled to provide information to the system interface 105 via a suitable client such as a personal computer or mobile communication device.

The goal setting source 140 may define, for example, behavioral, academic, or activity goals that a child must meet in order to have access to the electronic media sources 130. For example, a goal setting source 140, such as a parent, may list the daily or weekly chores that a child must complete before being allowed to play a game or watch television (e.g., wash dishes, take out garbage, feed the dog, finish mowing the lawn by Saturday); activity goals that a child must accomplish in order to play the game (e.g., arrive at school on time, no texting during class); and/or academic goals, daily, weekly or per semester, that must be achieved in order to access the electronic media source (e.g., scoring a B in math class, maintaining an A average across all subjects, making Honor Roll, completing a biology report by the end of the week). Although exemplary achievement goals have been identified above, it should be noted that the types, length, and number of goals may be defined by the goal setting source 140, and are not limited by the disclosed access control system 100. Also, although the term "child" is used to represent the user of the electronic media source 130 for which access is controlled, any person of any age may have his/her access to the electronic media source 130 controlled in accordance with the disclosed system and method.

The access control system 100 then registers one or more input data sources 120. The input data sources 120 are preferably identified by a goal setting source 140. The input data source 120 forwards assessment information to the access control system 100 via the system interface 105 to enable the system 100 to track the child's progress relating to the achievement goal(s). An example data input source 120 may be an automated online grade reporting system, such as Schoolloop.com™ or PowerSchool™, which provide via the internet a daily or weekly record of a child's grades and academic assessments.

Another example of a input data source 120 may be a mobile phone that provides location based information, which can be used to track whether a child is where he/she is supposed to be by a certain time. Although exemplary input data sources have been provided, there are numerous other sources that may be used, for example, a teacher, counselor, parent, or an electronic media source 130.

The access control system 100 also receives from a goal setting source 140 degree of access information that defines the degree of access that the child may have to the electronic media source 130 when the achievement goal(s) are met. Example degree of access information may include time limitations on access to an electronic media source 130, e.g., 1 hour per day, limitations on the types of electronic media source 130, including categorical media limitations, e.g., 1 hour per week of World of Warcraft™ online role-playing game, no mature game titles, no thriller movies, and/or no access to certain themed games.

Time limitations may also be included in the received degree of access information. The time limitations may include limitations, such as, daily or weekly time limits for accessing the electronic media source 130, duration time limits (e.g., limitation of 2 hours of electronic access, with at least 1 hour of some other activity interspersed), and specific day limitations (e.g., access granted only on Saturday or Sunday). The disclosed access control system 100 provides a goal setting source 140 with the ability to incentivize the use of electronic media, and also limit the types of media to which the child is exposed and the time of access.

Once the access control system 100 has received and stored the degree of access information, the goals are then mapped to the degree of access information by the access inquiry processor 101. Depending on the achievement goal and the degree of access information, the access inquiry processor 101 may perform a first order or a second order mapping. A first order mapping may directly link each behavioral/academic goal to a fixed degree of access to electronic media. For example, if a child completes his/her daily chores for the week, then the access control system 100 allows access to the electronic media for one (1) hour on Saturday and Sunday, in another example, the child may be allowed to access the electronic media for one (1) hour of World of Warcraft™ each day for a B grade in Math class.

A second order mapping may link a group of achievement goals to a fixed degree of electronic access. An example of a second order mapping may include allowing the child to watch 3 hours of TV on Saturday when the child has achieved an A grade in Math class and a B grade in English class.

As the access control system 100 receives the assessment information from the input data source(s) 120 through the system interface 105, the aggregation database 102 aggregates the assessment information for each of the achievement goals to then be used by the access inquiry processor 101.

In accordance with the disclosed system, the electronic media sources 130 preferably each have a means of communicating with the system interface 105. For example, an electronic media source 130 can include a mobile phone including an application ("app"), or a gaming system having a program installed, specifically programmed to interface with the access control system's system interface 105.

Preferably, an installed program on the electronic media source 130 requires the child to log onto the electronic media source 130 in order for it to operate. If an electronic media source 130 has no means of initiating communication with the access control system 100 through system interface 105, then the access control system 100 determines the state of electronic media source 130 through periodic requests (polling) for the state of the electronic media source 130. The state of the electronic media source 130 can include an indication of whether the child is logged onto the electronic media source 130, whether the electronic media source 130 is operating or network accessible, or other information related to the operation of the electronic media source 130.

Once the user (e.g., child) has logged onto the electronic media source 130, an access inquiry requesting an indication as to whether the child is able to use the electronic media source 130, is preferably forwarded by the electronic media source 130 to the access control system 100 via the interface system 105.

Alternatively, when there is no explicit mechanism for the user (e.g., child) to log into the electronic media source, other mechanisms can be employed to link the user to usage of a particular electronic media source. Such usage can be determined heuristically. For example, if it is known via received information related to electronic media source use that the user is the only member of the household to play World of Warcraft™, and World of Warcraft™ is engaged, the access control system 100 can determine that the user (e.g., child) is the principal engaged with World of Warcraft™. When it is not possible to heuristically deduce the user of an electronic media source, a query can be directed to a parent or other party with oversight responsibility toward the user asking for a determination of whether the user is engaged with a detected electronic media source.

Once the access control system 100 receives the access inquiry from the electronic media source 130, or the access control system 100 has determined the state of the electronic media source 130 through polling, the access inquiry processor 101 determines the degree of access allowed for the user using the aggregated assessment information from the aggregation database 102 and the first, second or higher order mapping. The access inquiry processor 101 compares the aggregated assessment information to the mapped goals to determine whether the user is able to access the electronic media source 130 and any corresponding access restrictions. Further, the amount of time the child has already accessed the electronic media source 130 is factored into this determination: in particular, it is determined whether the child has any allotted time left to access this particular electronic media source 130. Upon making this determination, the access inquiry processor 101 generates an access signal which is provided to the electronic media source 130 if the electronic media source 130 can receive control signals, which access signal can include a grant or deny signal, which grant signal may include access limits.

If it is determined that the child is allowed to access the electronic media source 130 at the time of the inquiry, the access control system 100 forwards to the electronic media source 130 the access signal, including a grant signal if such a grant signal exists for the electronic media source 130.

If it is determined that the child is not able to access the electronic media source 130 based on the access inquiry processor's 101 determination, the access control system 100 forwards the access signal, including a deny signal, preventing the child from using the electronic media source at that time. If the electronic media source 130 does not have a mechanism to constrain usage, an alert will be sent by the access control system 100 to the parent or other party with oversight responsibility toward the user, for example via the goal setting source 140, indicating that the user is attempting to engage with an electronic media for which the user should no longer have access. The access control system 100 can further send request to the parent or other party, for example via the goal setting source 140, to identify the user when the identity of the user attempting to use the electronic media source 130 is not clear or unknown.

Figure 2:
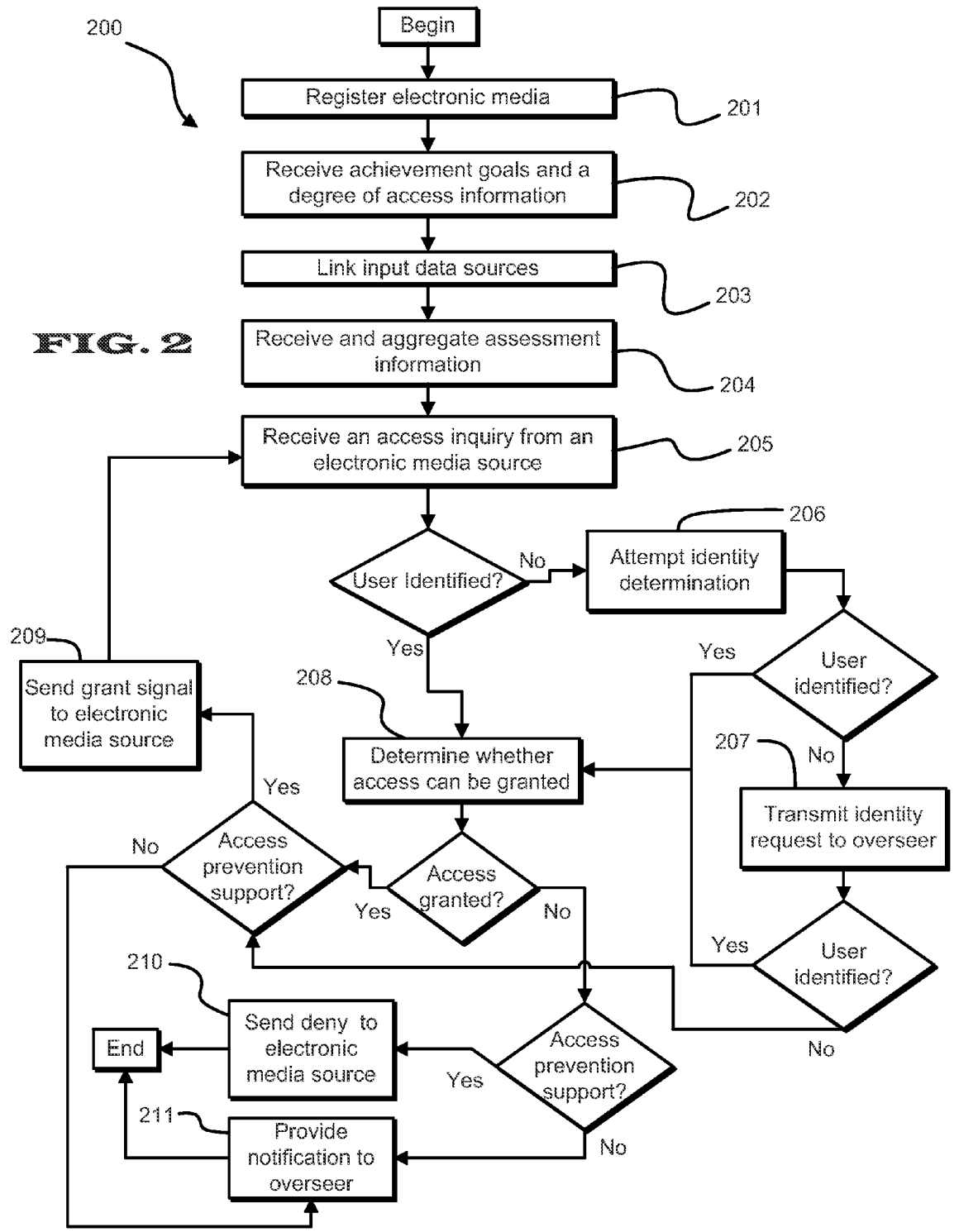
FIG. 2 is a flow diagram of a disclosed method for controlling access to electronic media sources.

A flow diagram of the disclosed computer implemented method 200 of controlling access to electronic media source is illustrated in FIG. 2. An access control system registers the electronic media source selected by a goal setting source, such as a parent or other overseer with oversight responsibility toward a user (e.g., child) (Step 201). Achievement goals and the degree of access information are then received by the access control system (Step 202).

The access control system is then linked to one or more input data sources that provide assessment information used by the access control system in determining the degree of access for the user (Step 203). Assessment information is then received and aggregated by the access control system from the linked input data sources (Step 204).

When the user (e.g., a child) attempts to use the electronic media source, and the electronic: media source is capable of initiating an access inquiry to the access control system, the access control system receives an access inquiry from the electronic media source (Step 205). Alternatively, if the media source is not capable of initiating an access inquiry to the access control system, the access control system periodically initiates a request (polls) for the state of the electronic media source. If the electronic media source can identify the user, the access inquiry provided to the access control system preferably includes the identity of the user. If the electronic media source cannot identify the user, and can initiate an access inquiry to the access control system, the electronic media source forwards the access inquiry with an indication, of use and type of use to the access control system. The access control system will attempt to deduce the identity of the user, preferably through heuristic analysis, based on prior knowledge of the electronic media usage (Step 206). If heuristic analysis is unable to determine the identity of the user, an inquiry is sent to the overseer, e.g., parent, indicating the electronic media source being engaged and the specific content being accessed, and the access control system will ask the overseer to establish the identity of the user of the electronic media source (step 207). The access control system, using the aggregated assessment information, determines whether the identified user is able to access the electronic media source based on the achievement goals and the degree of access information, which degree of access information can include for example a title or description of accessible content (Step 208). Based on a determined access level, if the electronic media source accepts communication from the access control system, the access control system forwards an access signal to the electronic media source. If the determined access level allows the child to access the electronic media source, the access signal includes a grant signal and any limits to the child's access (Step 209). If the electronic media source does not support access prevention, that is does not have a mechanism to constrain usage, notification is provided to the overseer (Step 211). If the user is not able to be identified, a grant signal can be forwarded to the electronic media source (Step 209), or alternatively where the electronic media source does not support access prevention, notification can be provided to the overseer (Step 211).

The access control system determines the time duration in which the user (e.g., child) engages with the particular electronic media source. The access control system periodically receives an access inquiry from the electronic media source inquiring whether the child is able to continue to access the electronic media source and/or a given title supported thereby (Step 205). If the electronic media source is not capable of initiating an access inquiry to the access control system, the access control system will periodically request state from the electronic media source, to determine if the user is still engaged with the electronic media source.

If the determined access level does not allow the child to access the electronic media, the access signal includes a deny signal (Step 210), thereby preventing the child from accessing the electronic media source. If the electronic media source does not support the ability to prevent access, an alert is sent to the overseer notifying the overseer of the user not having access or having exhausted access to the electronic media source (Step 211), whereby an overseeing user can take action such as physically preventing the user's access to the electronic media source. For example, a parent can repossess their child's smart phone.

Figure 3:
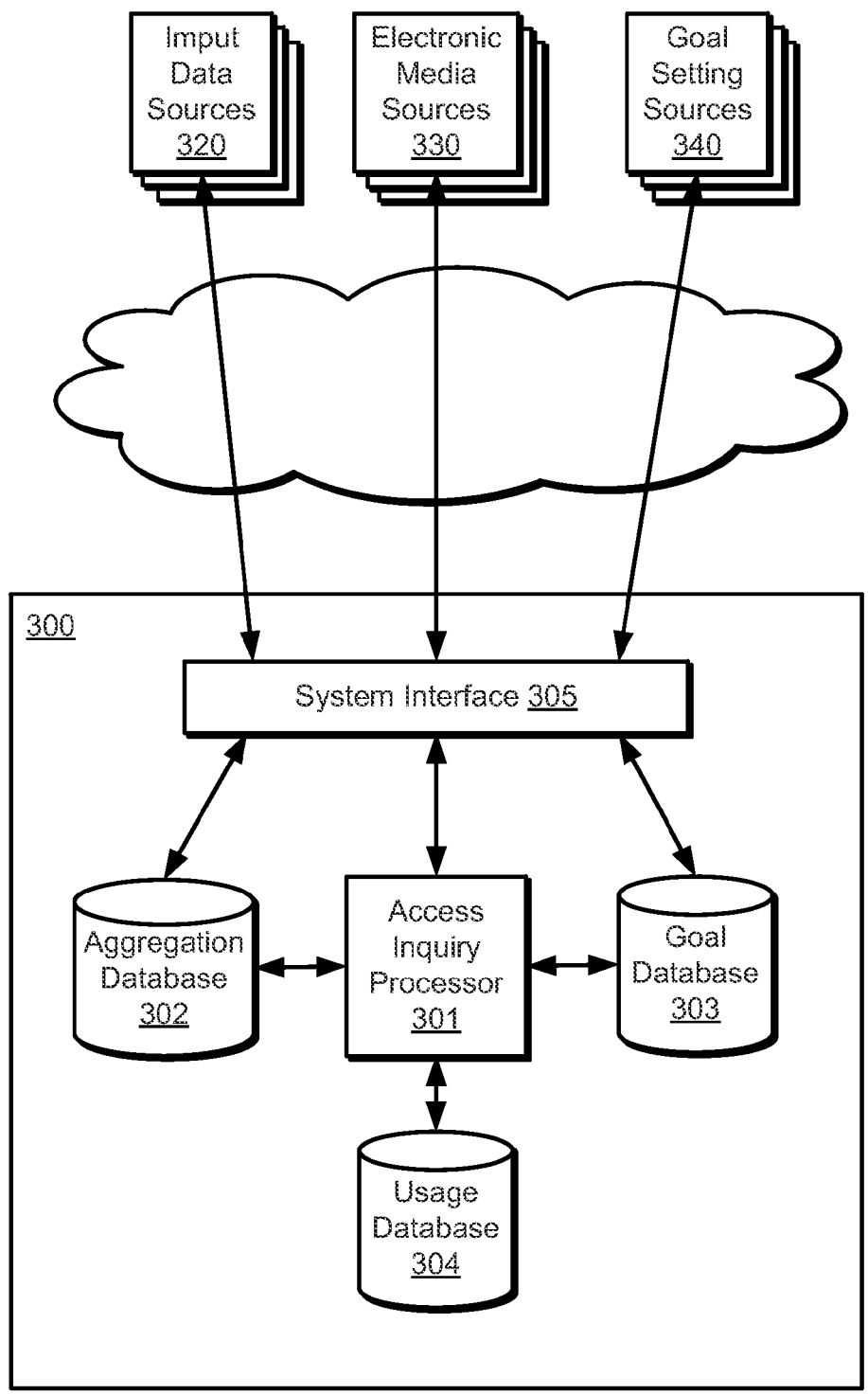
FIG. 3 is a block diagram of an example alternative system for controlling access to electronic media sources.

An access control system according to the invention may store tracking information relating to the child's usage of the electronic media. Another example access control system 300 in accordance with the invention is illustrated in FIG. 3.

The access control system 300 comprises an access inquiry processor 301, an aggregation database 302, a goal database 303, and a usage database 304. The access control system 300 operates similarly to the access control system 100 disclosed above. The usage database 304, coupled to the access inquiry processor 301, collects usage data related to the user. For example, the usage database 304 can store the amount of time a game was played on an electronic media source 330, and time of usage of an electronic media source 330. Upon request by a goal setting source 340, e.g., a parent, the access control system 300 may provide this stored information to the goal setting source 340 via the system interface 305.

Although the systems and computer implemented method of controlling access to electronic media have been disclosed by means of specific example, numerous modifications and variations could be made thereto by those skilled in the art without departing from the scope and spirit of the system and method set forth in the claims.

What is claimed is:

1. A computer-implemented method for controlling access to an electronic media source comprising:
   receiving one or more achievement goals and degree of access information for a first user from a second user, wherein the degree of access information includes limitations of access to the electronic media source including at least one of a time limit, a day of week limit, a media category limit, a content title limit, or a rating limit;
   receiving assessment information for the first user from one or more $3^{rd}$ party network-accessible input data sources, the assessment information related to the achievement goals;
   linking the $3^{rd}$ party network-accessible input data sources;
   aggregating the received assessment information;
   aggregating knowledge of electronic media source usage comprising at least knowledge of electronic media source usage by a first user;
   determining when the first user attempts to access an electronic media source;

receiving information related, to use of the electronic media source;
determining that an identity of a user of the electronic media source is that of the first user based on the received information related to use of the electronic media source and based on the aggregated knowledge;
determining whether the achievement goals are met by the first user using the received assessment information in response to an access inquiry from the electronic media source; and
forwarding an access signal to the electronic media source based on the determination of whether the achievement goals are met; wherein the access signal includes a grant signal when the achievement goals are met.

2. The computer-implemented method of claim 1, wherein the access signal includes a deny signal when the achievement goals are not met.

3. The computer-implemented method of claim 2, wherein the grant signal allows access to the electronic media source, and the deny signal prevents access to the electronic media source.

4. The computer-implemented method of claim 3, further comprising storing usage information when access to the electronic media source has been allowed.

5. The computer-implemented method of claim 1, wherein the electronic media source includes at least one of a gaming system, a television show, a video game, a movie, a computer, or a movie player.

6. The computer-implemented method, of claim 1, wherein the achievement goals include at least one of academic goals, chores, or activity goals.

7. The computer-implemented method of claim 1, farther comprising:
receiving an indication of usage of the electronic media source from the electronic media source; and
providing an indication to a particular party regarding the indication of usage based on the determination of whether the achievement goals are met.

8. The access control system of claim 1, wherein the one or more $3^{rd}$ party network-accessible input data sources comprises an automated online grade reporting system.

9. A computer-implemented method for controlling access to an electronic media source comprising:
receiving one or more achievement goals and degree of access information for a first user from a second user;
receiving assessment information for the first user from one or more $3^{rd}$ party network-accessible input data sources comprising an automated online grade reporting system, the assessment information related to the achievement goals;
aggregating knowledge of electronic media source usage comprising at least knowledge of electronic media source usage by a first user;
determining when the first user attempts to access an electronic media source;
receiving information related to use of the electronic media source;
determining that an identity of a user of the electronic media source is that of the first user based on the received information related to use of the electronic media source and based on the aggregated knowledge;
receiving an access inquiry from the electronic media source inquiring whether the electronic media source is able to be accessed by a user;
determining whether the achievement goals are met by the first user using the received assessment information; and
forwarding an access signal to the electronic media source based on the determination of whether the achievement goals are met; wherein the access signal includes a grant signal when the achievement goals are met.

10. The access control system of claim 9, wherein the access inquiry processor determines whether the achievement goals are met using the received assessment information in response to an access inquiry from the electronic media source.

11. A computer-implemented method for controlling access to an electronic media source comprising:
receiving one or more achievement goals and degree of access information wherein the degree of access information includes limitations of access to the electronic media source including at least one of a time limit, a day of week limit, a media category limit, a content tide limit, or a rating limit;
receiving assessment information from one or more 3rd party network-accessible input data sources, the assessment information related to the achievement goals;
providing an application on an electronic media source configured to enable interface with a network-connectable control system;
linking the 3rd party network-accessible input data sources;
aggregating the received assessment information;
aggregating knowledge of electronic media source usage comprising at least knowledge of electronic media source usage by a particular user;
determining an attempt to access an electronic media source;
receiving information related to use of the electronic media source;
determining that an identity of a user of the electronic media source is that of the particular user based on the received information related to use of the electronic media source and based on the aggregated knowledge;
determining whether the achievement goals are met by the determined particular user using the received assessment information in response to an access inquiry from the electronic media source; and
forwarding by the network-connectable control system an access signal to the electronic media source as corresponds to the determined user based on the determination of whether the achievement goals are met; wherein the access signal includes a grant signal when the achievement goals are met;
receiving the access signal by the electronic media source via the application and constraining usage by the particular use of the electronic media source based on the access signal.

12. A computer-implemented method for controlling access to an electronic media source comprising:
receiving one or more achievement goals and degree of access information wherein the degree of access information includes limitations of access to the electronic media source including at least one of a time limit, a day of week limit, a media category limit, a content title limit, or a rating limit;
receiving assessment information from one or more $3^{rd}$ party network-accessible input data sources, the assessment information related to the achievement goals;
linking the $3^{rd}$ party network-accessible input data sources;
aggregating the received assessment information;
receiving an indication of usage of the electronic media source from the electronic media source;

transmitting a query to a particular party for an identity of a user of the electronic media source, the query comprising at least one of an indication of the electronic media source or an indication of content accessed by the electronic media source;

receiving an indication of the identity of the user of the electronic media source from the particular party; and providing an indication to a particular party regarding the indication of usage based on the determination of whether the achievement goals are met by the identified user;

determining whether the achievement goals are met using the received assessment information in response to an access inquiry from the electronic media source;

forwarding an access signal to the electronic media source based on the determination of whether the achievement goals are met, wherein the access signal includes a grant signal when the achievement goals are met.

13. The computer-implemented method of claim 12, further comprising providing an indication to the particular party of specific content of the electronic media source accessed.

14. The computer-implemented method of claim 12, wherein providing the indication to the particular party regarding the indication of usage comprises alerting the particular party that the usage of the electronic media exceeds an allowed amount based on the determination of whether the achievement goals are met.

15. The computer-implemented method of claim 12, further comprising periodically requesting a state of the electronic media source.

16. An access control system for controlling access to an electronic media source comprising:

a goal database for storing achievement goals comprising an indication of at least one location and at least one time corresponding to the at least one location and for storing degree of access information wherein the degree of access information includes limitations of access to the electronic media source including at least one of a time limit, a day of week limit, a media category limit, a content title limit, or a rating limit;

an aggregation database for storing assessment information from one or more $3^{rd}$ party network-accessible input data sources input data sources comprising location based information and for linking the $3^{rd}$ party network-accessible input data sources and aggregating the received assessment information, the assessment information related to the achievement goals, and for aggregating knowledge of electronic media source usage comprising at least knowledge of electronic media source usage by a particular user; and an access inquiry processor for determining whether the achievement goals are met in response to an access inquiry from the electronic media source using the received assessment information by determining whether a mobile device corresponding to a particular user is located at a particular location at a particular time and for determining that an identity of a user of the electronic media source is that of the particular user based on received information related to use of the electronic media source and based on the aggregated knowledge;

wherein the access inquiry processor forwards an access signal to the electronic media source based on the determinations.

17. The access control system of claim 16, wherein the access signal includes a grant signal when the achievement goals are met, wherein the grant signal allows access to the electronic media source.

18. The access control system of claim 16, wherein the access signal includes a deny signal when the achievement goals are not met, wherein the deny signal prevents access to the electronic media source.

19. The access control system of claim 16, wherein the degree of access information includes limitations of access to the electronic media source.

20. The access control system of claim 19, wherein the limitations of access include at least one of a time of day limitation, a day of week limitation, a time duration limit, or a type of electronic media source limitation.

21. The access control system of claim 16, wherein the achievement goals include at least one of academic goals, chores, or activity goals.

22. The access control system of claim 16, further comprising a system interface for communicating with the one or more input data sources and the electronic media source.

23. The access control system of claim 16, further comprising a usage database for storing electronic media source usage information when access to the electronic media source is allowed.

* * * * *

UNITED STATES PATENT AND TRADEMARK OFFICE
CERTIFICATE OF CORRECTION

PATENT NO.         : 9,489,531 B2
APPLICATION NO.    : 13/470321
DATED              : November 8, 2016
INVENTOR(S)        : Andrew Weiss It is certified that error appears in the above-identified patent and that said Letters Patent is hereby corrected as shown below:

In the Specification

At Column 3, Line 46, delete "Sunday, in" and insert therefore -- Sunday. In --.

In the Claims

At Claim 7, at Column 7, Line 32, delete "farther" and insert therefore -- further --.

At Claim 11, at Column 8, Line 16, delete "tide" and insert therefore -- title --.

Signed and Sealed this
Twenty-eighth Day of February, 2017

Michelle K. Lee
*Director of the United States Patent and Trademark Office*